Figure 3:
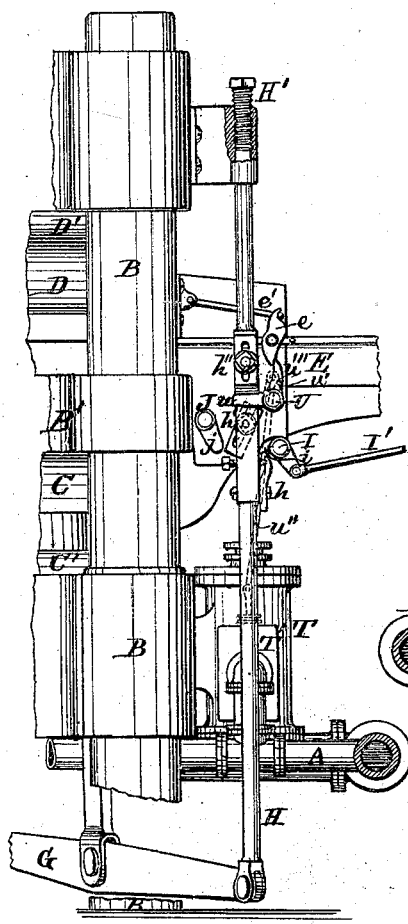

E. ROGERS.
Machines for Molding and Pressing Bricks by Hydraulic Pressure.
No. 143,188. Patented September 23, 1873.
2 Sheets--Sheet 1.
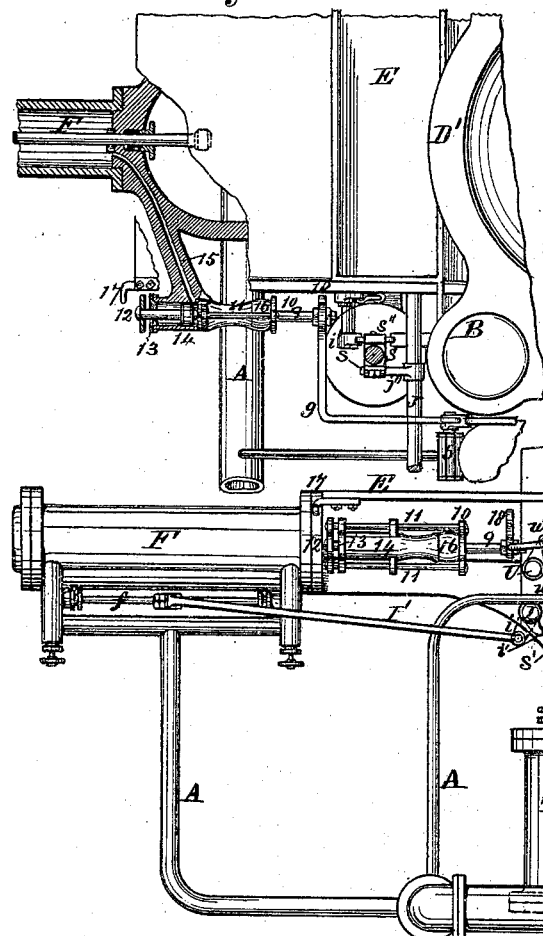

2 Sheets--Sheet 2.

E. ROGERS.
Machines for Molding and Pressing Bricks by Hydraulic Pressure.

No. 143,188.                    Patented September 23, 1873.

WITNESSES:
Jas. L. Ewin
Walter Allen

INVENTOR:
Ethan Rogers
By Knight Bros.
Attys.

UNITED STATES PATENT OFFICE.

ETHAN ROGERS, OF CLEVELAND, OHIO.

IMPROVEMENT IN MACHINES FOR MOLDING AND PRESSING BRICKS BY HYDRAULIC PRESSURE.

Specification forming part of Letters Patent No. 143,188, dated September 23, 1873; application filed March 13, 1873.

*To all whom it may concern:*

Be it known that I, ETHAN ROGERS, of Cleveland, in the county of Cuyahoga and State of Ohio, have invented certain Improvements in Machine for Molding and Pressing Brick by Hydraulic Pressure, of which the following is a specification:

This invention relates to improvements on my patent of September 23, 1856, No. 15,778, extended at expiration of the first term. Reference is made to the aforesaid patent for general description of the machine.

The first part of my improvement relates to a valve taking the place of the small valve $f$ in the original patent. In said patent the valves $d$ and $f$ are entirely separate and disconnected from the valve O. This part of my improvement consists in forming an axial water-passage through the stem of the valve $d$, the said passage communicating with the upper chamber through side perforations in the stem. The bottom of this passage is closed by the small valve taking the place of the valve $f$ in the original, and the stem of this valve is socketed in that of the valve O of the original, and is opened by the downward movement of the same, and closed by a spring in said socket.

The second part of my invention relates to the devices for taking the hydraulic pressure from the upper plunger when the bricks are pressed sufficiently. In the original, the valve $f$ is held down by a weight or spring, which is overcome when the pressure reaches the desired point, and the valve is raised, allowing the escape of water from the upper ram, and releasing the pawl V from the lever U, which allows the partial rotation of the disk $y$, by which the valve O is closed to disconnect the upper ram from the pumps. My improvement consists in providing a small hydraulic cylinder and piston, in constant communication with the water-column connecting the two rams, and placing beneath the piston a spring, so that when the proper amount of pressure is reached, the piston descends and releases a pawl which admits the water-pressure on a piston to change the valve of a water-engine that closes the valve O, and draws the small valve (taking the place of that $f$ in the original) from its seat in the upper valve, allowing the escape of water from the upper ram. The spring-piston is connected to a cog-rack working an indicator, to show the pressure.

The third part of my improvement relates to a substitute for the means employed in the original to raise the upper plunger from the bricks. In my present improvement, a rod is attached to the upper part of the said plunger, said rod passing through a stuffing-box, and being connected to one end of an oscillating beam, whose other end is connected to the piston of an engine operated by water, so as to raise the plunger from the bricks at the proper time.

The fourth part of my improvement relates to a hydraulic piston beneath the lower ram, whose rod is connected to the bottom of the plunger of the same. The upper part of the cylinder of said piston communicates with the water-pipes, so that the piston causes a constant downward force on the plunger, and insures its speedy descent when the water is allowed to escape from the ram-cylinder.

The fifth part of my improvement consists in the provision of a water-engine to operate the valve. (O in the original.) The oscillating valve of this engine is moved in one direction by a lug on the charger, and in the other direction by the plunger of a cylinder communicating with the pipes containing water under pressure.

The sixth part of my improvement relates to the device for reversing the valve of the engine, by which the upper mold is raised from the brick, so as to allow the mold to drop down upon a fresh supply of clay. The above device consists of a pivoted arm on the frame, which engages one end of a lever-block upon the charger, and as the charger reaches its backward position (so as to be out of the way of the descending plunger) this lever acts on an arm of a rock-shaft, by which the aforesaid valve is operated.

Figure 5:
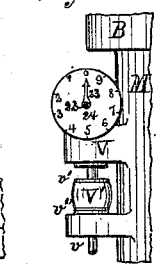
Figure 4:
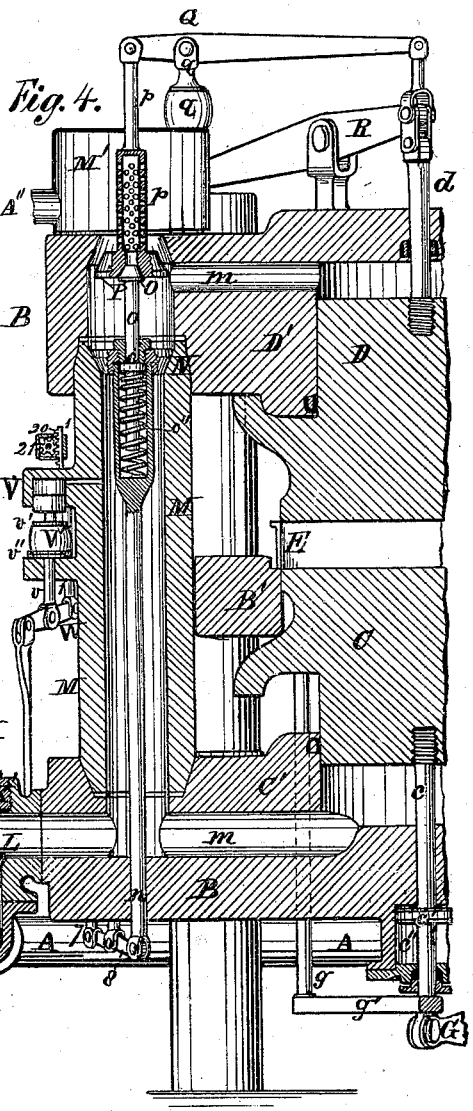

Figure 1 is a side view, with both of the rams raised, and the charger on the point of moving forward. Fig. 2 is a plan of a portion of the machine, with some parts in section. Fig. 3 is an elevation of the opposite side to that shown in Fig. 1. Fig. 4 is an axial section of the rams and vertical water-pipe connecting them, showing the valves in the latter. Fig. 5 is a front view of the indicator-disk.

The parts of the machine are shown in the same position in all the figures to avoid confusion.

A A' are, respectively, the water-pipes communicating with the low and high pressure pumps. Each of these pipes, in proximity to the pumps, is provided with a safety-valve, which is loaded to any point desired, and which discharges into the tank from which the pumps are supplied. A'' is a pipe leading from the press to said tank, the waste water from the rams passing out through this pipe. B is the main frame of the machine, supporting at near mid-height the mold B'. C is the lower plunger, working in a cylinder, C'. D is the upper plunger, working in a cylinder, D'. E is the charger, by which the "pressing" of bricks is forced out and a fresh supply of clay simultaneously brought forward to charge the mold. F is the water-engine, by which the charger is moved forward and backward. The parts so far are similar to those described in my patent No. 15,778. From the bottom of the lower plunger C extends a rod, c, of a piston, c', working in a cylinder, c'', whose upper end communicates with the pipes A, and whose lower end exhausts freely. The pipes A are connected with the low-pressure pump and with a large air-vessel, so as to keep the water therein always under about a certain pressure, and all the water-engines are worked by water from this source. The piston c' acts continuously to draw down the lower ram. From the lower ram extend downward two rods, g, connected by a cross-head, g', to a beam-lever, G, to whose other end is connected a vertical sliding rod, H, by which the downward movement of the ram is limited by a screw, H'. The said rod carries three tappets, h h' h''. The tappet h (when the plunger C is reaching its lower position) acts on an arm, i, of a rock-shaft, I, and connecting-rod I', to change the slide-valve f of the water-engine F, to cause it to draw the charger backward, the charger E having previously, while the plunger or ram C was in its raised position, moved forward, carrying a fresh supply of clay, and with its front bar shoving the last pressing of bricks from the top of the mold to the receiving-table. The tappet h' acts on an arm, j, of the rock-shaft J, to raise the crank-arm j', connected by a pitman, k, with the lever K, by which the valve L is held down by a socket-rod, K'. (The action of the valve L is similar to its action in my former patent.) The said valve L closes the orifice connecting the pipes A with the vertical water-pipe M that is in connection with the cylinders of both rams by horizontal water-passages m. The tappet h'' acts on an arm, u, of a rock-shaft, U, crank-arm u', and pitman u'', (when the plunger C is ascending and the rod H descending,) to reverse the slide-valve T' of the engine T, so as to raise the plunger D from the bricks by means of the piston-rod S of said engine and lever and rod R and d, and from this position the slide-valve T' of the engine T is again reversed to cause the piston-rod S to ascend, and, by means of the lever R and rod d, assist in forcing the plunger D down upon the clay. This last movement of the valve is accomplished by the following means: Upon the side of the charger E is pivoted a trip-lever, e, the upper end of which (as said charger is attaining its backward position) is engaged by the pivoted hook e' pivoted to the frame B, so as to turn the said trip-lever e, the lower end of which engages against and turns the arm u''' of the rock-shaft t, (see Fig. 3,) with its crank-arm u' and pitman u'', (see Figs. 1 and 3,) so as to cause the said reversal of the valve T' and reverse movement of the engine T. The piston-rod S of the engine T is connected at its upper end to the beam-lever R, the other end of which lever is connected by a rod, d, with the plunger or ram D, the rod d passing through a stuffing-box. The rod S carries two adjustable tappets, s s', and a pivoted trip-lever, s''. The tappet s, when the plunger D is about attaining its upper position and the rod S is consequently reaching its lower position, strikes against the arm j'' of the rock-shaft J to elevate the crank-arm j' to the position shown, (see Fig. 1,) and hold down the valve L by means of the lever K and pressure-rod K', whose socket receives the valve-stem. (See Figs. 1 and 4.) This closes the connection between the high-pressure pipes A and pipe M. The tappet s', on the descent of the upper plunger or ram D, impinges against the arm j'' to turn the rock-shaft U and allow the valve L to rise, by movement of the lever K and rod K'. The valve L is then raised by the preponderance of the water-pressure beneath it. The toe s''' of the tripper s'', when the rod S is reaching its lower position, impinges against the fixed lug s'''', and the other end of the said tripper impinges against the arm i' of the rock-shaft I to reverse the slide-valve f of the charger-engine F, by means of the arms i and rod I', and the engine F then drives the charger forward. The water from both the high and low pressure pumps passes into both ram-cylinders C' and D', the water passing through the vertical pipe M and horizontal pipes m m. In the pipe M is a valve N, which, when closed, cuts off the supply of water to the upper ram-cylinder D'. In order to operate said valve N, to open and close communication between the water-pipe M and the ram-cylinder D', the valve has a stem, n, passing vertically down the pipe M and through a stuffing-box, and connected to the end of a lever, 8, whose other end is connected to the piston-rod 7 of a water-engine, 6, which has an oscillating valve, 5, which is operated to reverse the engine 6, to open or close the valve N by the following connections: V is a cylinder whose upper (and inner) end is in communication with the water-column in M.

The rod $v$, of the plunger or piston of said cylinder, carries a fixed collar, $v'$, that rests on a spring, $V'$. (For this spring a block of india rubber is suitable, as shown.) Beneath the spring are graduating-disks $v''$ to regulate the position to which the collar $v'$ shall descend by a certain pressure above the top of the plunger in cylinder V. The inside of the cylinder C' D', pipe M, and cylinder V, all communicate together, and when the pressure of the water is increased to a certain point the spring V' is depressed so as to depress the lever W, to which the lower end of the rod $v$ is pivoted. The free end of the lever W is connected to the rack-rod 1, carrying jam-nut collar 2 above the forked end of the lever 3, so that, as the rack-rod is drawn down, that end of the lever 3 is drawn down with it, and the catch at the other end is drawn up from the arm 4 on the stem of the oscillating valve 5 of the engine 6. As the valve-arm 4 is released from the catch of the lever 3 (see Fig. 1) that arm is drawn to the position shown, so as to reverse the valve 5 to cause the rod 7 to be drawn upward, and by means of the engine 6. The rod 7 is connected to the lever 8, and that to the stem or rod $n$, to draw down the valve N and close it, as shown in Fig. 4. This shuts off communication between the water-supply from the pumps and the upper ram-cylinder D'. The movement of the arm 4, on its release from the catch-lever 3, is caused by its connection by the rod 9 to a cross-head, 10, secured by side rods 11 to the cross head 12 on the piston-rod 13 of the hydraulic cylinder 14. The inner end of the cylinder 14 (see Fig. 2) communicates by a water-passage, 15, with one end of the cylinder F, so that when the water is entering or exhausting from that end of the cylinder F which is nearest the charger, the water enters or exhausts from the cylinder 14. 16 is a spring, easing the movement of the cross-head 10, and other parts connected to it. Thus the only action of the engine 14 is to reverse the valve 5 in one direction, whenever its arm 4 is released from the catch 3. When the charger E again moves forward the valve-arm and valves 4 and 5 are again operated to reverse the engine 6 to cause the valve N to open communication between the pipe M and the ram-cylinder D'. This reversal is accomplished by means of the lug 17 on the side of the charger, which comes in contact with a lug, 18, on the rod 9 as the charger moves forward, and swings or oscillates the valve-arm 4 to engage it under the catch of the lever 3, which holds the valve 5 in this position, to keep open the valve N until the arm 4 is again released by the rising of the catch-end of the lever 3, as before stated. 19 is the exhaust orifice of the engine 6. P is a valve seated in the upper end of the water-pipe M, and above the passage $m$ of the ram-cylinder D', the valve-stem $p$ of which is connected to a lever, Q, having a spring-fulcrum, $q$, and connected at the other end to the rod $d$ ascending from the center of the upper plunger D, so that the valve P is closed by the downward movement of said plunger D, and opened by its upper movement to allow the water to escape freely from the ram-cylinder D' when the valve P is open, as shown in Fig. 4, and to allow, when the valve N is open, the water from the low-pressure pump (the high-pressure pump being cut off by the valve L) to pass up freely through the pipe M and escape into the water-chamber M', communicating, by pipe A'', with the tank from which the pumps are supplied. O is a valve seated in a central perforation in the valve P, the stem $o$ of which is socketed in the upper end of the stem $n$ of the valve N. Said stem $o$ has a collar, $o'$, against whose lower side acts a spiral spring, $o''$. The stem $p$ of the valve P is tubular, and has perforations, allowing the water passing through the port of the valve O to pass into the water-chamber M, communicating with the tank from which the pumps are supplied. The purpose of this valve O is to allow the water to escape from the upper ram-cylinder D' before and until the valve P opens. The arrangement of the valves N O P is such that when either of those N P is open the valve O is closed by the spring $o''$, but the distance between the head O and the collar $o'$ is so short that when both the valves N and P are closed the valve O is open, its stem $o$ being too short to reach from one to the other; thus when the valve N is closed to cut off communication between the water-column M and the cylinder D', the valve N in descending draws down the valve O from its seat in P by means of the collar $o'$, as shown, and allows the water in limited quantity to escape from the cylinder D' through the hollow stem $p$ and into the outflow water-chamber M'. This of course relieves the ram D from some of the downward pressure upon it, and it and the bricks are carried up by the pressure beneath the ram C, and as it reaches its upper position it, through the rod $d$, lever Q, and stem $p$, opens the valve P and allows the free discharge of the water from the cylinder D' into the water-chamber M'; then, as the valve N is again raised, the water escapes from both ram-cylinder C' and D', and, as the valve N is raised, the spring $o''$ carries up the small valve O and closes it in its seat in P; and, when P is again closed by the descent of the ram D, the spring $o''$ carries up the valve O with the valve P, so that it remains closed until the closing of the valve N, as described.

It will be seen that each of the separate movements of the press is started by the parts last in action, and such start depends on the completion of the last movement, so that if any part of the machine should give way the press is brought to a stand without the injury spreading to the other parts.

All the water-engines may exhaust into pipes flowing into the open tank from whence the high and low pressure pumps are supplied with water.

At the upper end of the rod 1 is a rack, 20, which engages with a spur-wheel, 21, on the shaft 22 of a finger, 23, turning in front of a graduated disk, 24, to indicate the pressure upon the bricks. The purpose of this indicator is as a tell-tale, to show if, owing to any leak or for other reason, the machine is not operating properly.

In setting the indicator, the safety-valve of the high-pressure pump is loaded to the desired pressure, and then a sufficient number of disks, $v''$, are placed beneath the spring to give it the desired force. Then the finger 23 is so turned as to be carried to the number on the face, indicating, in hundreds of tons, the pressure at which the piston $v$ is forced down. The safety-valve of the high-pressure pump is then additionally loaded.

The operation of my machine is as follows: The charger E receives a supply of clay, and is propelled forward between the plungers by the action of the engine F. The last pressing of bricks is, by the charger, pushed off the lower plunger C. As the charger reaches its forward position the lug 17 strikes against the lug 18 and reverses the valve 5 of the engine 6, so as to open the valve N; the plunger C then drops, being impelled thereto by its weight and that of the clay and the draw-piston $c\ c'$. This opens the mold B to receive the clay. As the lower plunger C reaches its lowest position the tappet $h$ engages the arm or lug $i$ and reverses the valve $f$ of the engine F, and the charger is drawn back. As the charger is drawn back and is just reaching its backward position the hook $e'$ engages the lever $e$, which acts on the lug or arm $u'''$ to reverse the valve T' of the engine T. This allows the descent of the upper plunger, D, upon the clay, which closes the valve O by means of the lever Q and the power of both pumps is exerted on the rams. When the low-pressure pump safety-valve commences to discharge, the pressure of water from the high-pressure pump flowing through pipe A' closes the valve L. The plungers are then forced together by the power of the high-pressure pump until the pressure becomes great enough to compress the spring $v'$, when the lever 4 is released from the catch-lever 3 and the valve 5 of the engine 6 reversed by the action of the draw-piston 13. This engine then, by means of rod 7 and lever 8, closes the valve N, which draws open the small valve $o$ by the collar $o'$ and allows the water to escape from above the upper plunger into the water-chamber M', from which it flows into the pump supply-tank. The lower plunger C is now alone acted on by the pumps and rises, forcing up the pressed bricks and the upper plunger. As the lower plunger rises the tappet $h'$ engages the arm or lug J and raises the crank-arm $j'$. As the plunger D ascends, (the rod S descending,) the tappet $s$ impinges against the arm or lug $j''$ and carries the arm $j'$ onto a center, holding down the valve L by lever K and stem K'. The upper plunger D, in rising, also opens the valve P and allows the water to escape from the cylinder D'. The plunger C, on arriving at its upper position, with its top flush with the top of the mold, brings the lug $h''$ on the rod H against the arm or lug $u$ and turns the rock-shaft U so as to reverse the valve T' of the engine T, and the pressure of the water above the piston of this engine draws up the plunger D from off the bricks. As the plunger D reaches its upper position the tilting-lever $s''$ is canted by impinging against the lug $s''''$, and the valve $f$ of the engine F is again reversed to move forward the charger.

I claim as my invention—

1. The combination of the valves N O P, arranged substantially as and for the purpose set forth.

2. The device for removing the pressure from the top of the upper plunger when a certain pressure is attained, the said devices consisting of the cylinder V, spring-piston $v'$ V', rod $v$, lever W, rod 1, lever 3, arm 4, engine 5 6, rod 7, lever 8, valve-stem $n$, and valve O, substantially as set forth.

3. In combination with the upper plunger D, the water-engine T, by which the said plunger is held down upon the bricks against the upward pressure of the lower plunger C, when both are rising, and the upper plunger is raised from the bricks to allow the removal of the pressed bricks.

4. The combination of the lower plunger C and piston and cylinder $c'\ c''$, to aid the descent of the plunger against the pressure of the water column in the vertical pipe M.

5. The combination of the valve N, water-engine 6, arm 4, lever 3, and spring-piston V' $v$, closing the valve N between the two rams, to cause them to rise simultaneously, substantially as described.

6. The combination of the hooked arm $e'$, lever $e$, lug or arm $u'''$, rock-shaft U, arm $u$, pitman $u''$, slide-valve T', engine T, rod S, lever R, rod $d$, and upper plunger D, substantially as and for the purpose set forth.

7. The pulling-engine 13 14, acting to reverse the valve 5 of the engine 6 when released from the catch-lever 3, substantially in the manner and by the means described.

8. The combination of the engine F, passage 15, and engine 13 14, allowing the operating of both engines by a single slide-valve, $f$, substantially as set forth.

9. In combination with the plunger C, operating as described, the screw H' to limit the upward movement of the rod H, so as to adjust the depth of the mold to the condition of the clay used and the desired thickness of the bricks.

ETHAN ROGERS.

Witnesses:
DANL. DUTY,
E. C. STERLING.